(12) United States Patent
Debus et al.

(10) Patent No.: US 9,268,151 B2
(45) Date of Patent: Feb. 23, 2016

(54) APPARATUS FOR THE GENERATION OF EXTREMELY SHORT-WAVELENGTH, ULTRA-SHORT DURATION LIGHT PULSES

(75) Inventors: Alexander Debus, Dresden (DE); Michael Bussmann, Dresden (DE)

(73) Assignee: Helmholtz-Zentrum Dresden-Rossendorf e.V., Dresden (DE)

( * ) Notice: Subject to any disclaimer, the term of this patent is extended or adjusted under 35 U.S.C. 154(b) by 537 days.

(21) Appl. No.: 13/697,934

(22) PCT Filed: May 16, 2011

(86) PCT No.: PCT/DE2011/075111
§ 371 (c)(1),
(2), (4) Date: Feb. 28, 2013

(87) PCT Pub. No.: WO2011/141024
PCT Pub. Date: Nov. 17, 2011

(65) Prior Publication Data
US 2013/0148203 A1   Jun. 13, 2013

(30) Foreign Application Priority Data

May 14, 2010   (DE) .......................... 10 2010 028 994

(51) Int. Cl.
*G02B 5/18*   (2006.01)
*G02B 27/44*   (2006.01)
(Continued)

(52) U.S. Cl.
CPC ................ *G02B 27/44* (2013.01); *G02B 27/00* (2013.01); *G02B 27/4233* (2013.01);
(Continued)

(58) Field of Classification Search
CPC ........ G02B 27/00; G02B 27/42; G02B 27/44; G02B 5/18; H01S 3/00; H01S 3/09; H01S 3/10; H01S 3/14; H01S 3/30; H01S 3/91; H01S 3/093; H01S 3/094; H01S 3/0903; H01S 3/0915; H01S 3/0959; H01S 3/0971; H01S 3/0973; H01S 3/0975; H01S 3/0057; H01S 3/1024; H01S 2301/00; H01S 2301/02; H01S 2301/03; H01S 2301/04; H01S 2301/06; H01S 2301/08; H05G 2/00; H05G 2/001; H05G 2/005; H05G 2/008
USPC .......... 359/558–576, 615; 372/25, 70, 84, 102
See application file for complete search history.

(56) References Cited

U.S. PATENT DOCUMENTS 5,016,250 A * 5/1991 Rosen et al. ....................... 372/5
5,077,621 A * 12/1991 Kuhnle et al. ................. 359/566
(Continued)

OTHER PUBLICATIONS

Hartemann, F. V. et al., "Compton scattering x-ray sources driven by laser wakefield acceleration", 2007, The American Physical Society, 10, pp. 011301-1 through 011301-8.*
(Continued)

*Primary Examiner* — Arnel C Lavarias
(74) *Attorney, Agent, or Firm* — Laurence A. Greenberg; Werner H. Stemer; Ralph E. Locher

(57) ABSTRACT

Extremely ultrashort and short-wave light pulses are generated with the aid of the traveling-wave Thomson scattering process. Dispersive elements are arranged between an electron, particle, or radiation source, which is synchronized with a laser system, and an optical element that focuses in a direction. The device is used to superpose a pulse-front tilted light pulse of high power with an ultrashort pulse of relativistic electrons in a laser-line focus. By varying the laser pulse-front tilt, narrow-band radiation pulses in a wide wavelength range from EUV to X-ray wavelengths and having a high number of protons are obtained, and the bandwidth and coherence properties can also be modified. The system can be used, among other things, in EUV lithography, in the planning and optimal design of laser systems and electron sources, in material analysis by phase contrast imaging, and in superconductor research. The assembly is smaller and cheaper than current comparables.

10 Claims, 3 Drawing Sheets

(51) Int. Cl.
G02B 27/42 (2006.01)
H01S 3/00 (2006.01)
H01S 3/09 (2006.01)
H01S 4/00 (2006.01)
H05G 2/00 (2006.01)
G02B 27/00 (2006.01)
H01S 3/094 (2006.01)
H01S 3/102 (2006.01)

(52) U.S. Cl.
CPC ............ *H01S 3/0057* (2013.01); *H01S 3/0903* (2013.01); *H01S 4/00* (2013.01); *H05G 2/00* (2013.01); *H01S 3/094* (2013.01); *H01S 3/1024* (2013.01)

(56) References Cited

U.S. PATENT DOCUMENTS 5,353,291 A * 10/1994 Sprangle et al. ................. 372/5
2005/0213708 A1* 9/2005 Lawrence et al. ............. 378/119

OTHER PUBLICATIONS

Tondello, G., "The use of a toroidal mirror as a focusing element for a stigmatic grazing incidence spectrometer", 1979, Optica Acta, 36, No. 3, pp. 357-371.*

McKinney, Wayne R., "Varied line-space gratings and applications", 1992, Review of Scientific Instruments, 63(1), pp. 1410-1414.*

Chanteloup, J.-C., "Pulse-front control of 15-W pulses with a tilted compressor, and application to the subpicosecond traveling-wave pumping of a soft-x-ray laser", 2000, Journal of the Optical Society of America, vol. 17, No. 1, pp. 151-157.*

Osborn, K. D., et al.,"Two new optical designs for soft x-ray spectrometers using variable-line-space gratings", 1995, Review of Scientific Instruments, 66(5), pp. 3131-3136.*

Schwoerer, H., et al., "Thomson-Backscattered X Rays From Laser-Accelerated Electrons", 2006, Physical Review Letters, 96, pp. 014802-1 through 014802-4.*

Anderson, S. G., et al.,"Short-pulse, high-brightness X-ray production with the PLEIADES Thomson-scattering source", 2004, Applied Physics B, 78, pp. 891-894.*

Ride, S. K., "Thomson scattering of intense lasers from electron beams at arbitrary interaction angles", Physical Review E, 52, pp. 5425-5547.*

Sears, F. W., Principles of Physics III, "Optics", 1945, Addison-Wesley, Second Edition, pp. 64-70.*

Sears, F. W., Principles of Physics III, "Optics", 1945, Addison-Wesley, Second Edition, pp. 191-199.*

A. D. Debus et al: "Traveling-wave Thomson scattering and optical undulators for high-yield EUV and X-ray sources", Applied Physics B: Lasers and Optics, vol. 100, No. 1, May 28, 2010, pp. 61-76, XP55019416, ISSN: 0946-2171.

A. Debus et al: "Linear and non-linear Thomson-scattering x-ray sources driven by conventionally and laser plasma accelerated electrons", Proceedings of SPIE, Jan. 1, 2009, pp. 735908-735908-12, XP55019357.

Richard A. Snavely: "Traveling wave-pumping of ultra-short-pulse x-ray lasers", Proceedings of SPIE, vol. 3156, Jan. 1, 1997, pp. 109-113, XP55019624, ISSN: 0277-786X.

Jean-Christophe Chanteloup et al: "Pulse-front control of 15-TW pulses with a tilted compressor, and application to the subpicosecond traveling-wave pumping of a soft-x-ray laser", Journal of the Optical Society of America B, vol. 17, No. 1, Jan. 1, 2000, p. 151, XP55019619, ISSN: 0740-3224.

Sandor Szatmari et al: "Pulse Compression and Traveling Wave Excitation Scheme Using a Single Dispersive Element", Applied Optics, Optical Society of America, Washington, DC; US, vol. 29, No. 36, Dec. 20, 1990, pp. 5372-5379, XP000171339, ISSN: 0003-6935.

Hettrick M C: "Varied line-space gratings: past, present and future", Proceedings of SPIE, SPIE, US, vol. 560, Jan. 1, 1986, pp. 96-108, XP009156510, ISSN: 0277-786X.

T. Gowa et al., "Development of a Compact X-ray Source and Super-sensitization of Photo Resists for Soft X-ray Imaging", Journal of Photopolymer Science and Technology, vol. 22, No. 5 (2009) pp. 691-696.

* cited by examiner

APPARATUS FOR THE GENERATION OF EXTREMELY SHORT-WAVELENGTH, ULTRA-SHORT DURATION LIGHT PULSES

BACKGROUND OF THE INVENTION

Field of the Invention

The application describes a system for generating (very) short-wave ultra-short light pulses and the resulting possible uses.

Thomson scattering of laser sources is limited so far by two parameters, once the interaction length between the laser and electrons and the other, the maximum laser intensity.

The length of the interaction is determined by the Rayleigh length, usually in the range of several micrometers, which may be extended only by lower radial focusing of the laser.

An even smaller fraction of the laser light interacts with the electrons by extension of Rayleigh length for a given electron beam diameter, thereby, the efficiency is drastically reduced. Furthermore, by increasing the laser intensity, the number of photons in a narrow energy band cannot any be increased, because this leads to the disturbance of the electron trajectories on basis of non-linear laser-electron interaction and thus to produce higher frequencies. Therefore, sources based on Thomson scattering were planned especially for highly repetitive laser systems with low peak power and high average power.

This provides nevertheless no temporally coherent pulses and few photons per single shot.

In the range of EUV and XUV, pluralities of competing source concepts exist because of the important lithographic application by reduction of semiconductor structures. In particular, the laser-driven nonlinear generation of shorter wavelengths in gases and the high harmonic generation using laser-plasma interaction are mentioned. These sources provide ultra-short light pulses with laser-like properties, but do not have high single-shot performance. Moreover, these systems are difficult scalable to higher photon energies and they have problems with avoidance of debris by high average power due to the used plasmas, because debris limits the lifetime of the used optics. Other types of sources for the wavelength range from EUV to XUV are characterized by high divergence and not enough photons reach the target wavelength. [Jonkers, J.: *High power extreme ultra-violet (EUV) light sources for future lithography*. Plasma Sources Science and Technology (15) 2006. pp. 8-16.]

In the field of X-ray, competing systems are existing storage ring-based X-ray sources of the fourth generation, like the ESRF (European Synchrotron Radiation Facility) or the ring accelerator PETRA at DESY. These, however, provide neither comparable nor short pulses and they do not allow for a wide tunability of the wavelength.

The number of photons per shot is also not very high and the radiation lacks the temporal coherence. The size of these facilities and the level of associated operating costs make this infrastructure very expensive, stuff intensive and inflexible in adapting to new requirements.

Thomson sources like PLEIADES [Hartemann, F. V. et al.: *Compton scattering and its applications: The PLEIADES Femtosecond X-ray source at LLNL*. International Workshop on Quantum Aspects of Beam Physics, Hiroshima, Japan, Jan. 7, 2003-Jan. 10, 2003] or like NewSUBARU [Amano, S. et al: *Several-MeV γ-ray generation at NewSUBARU by laser-Compton backscattering*. Nuclear Instruments and Methods in Physics Research A 602 (2009). pp. 337-341] generate hard, monochromatic X-rays, and have much lower requirements with respect to the required electron energies, because laser pulses are used as optical undulators. However, the number of photons per shot is also not very high and the radiation lacks the temporal coherence. These systems also scale poorly to higher peak power lasers.

High photon numbers per pulse deliver so far only free electron lasers (FEL) such as FLASH or LCLS. Even more than storage rings are FELs large systems with all the attendant disadvantages, in terms of size and cost of the infrastructure [Pellegrini, C. et al: *The Development of X-Ray Free-Electron Lasers*. IEEE Journal of Selected Topics in Quantum Electronics (19), 2004, No. 6, pp.1393-1404.].

Compact (table-top) SASE FEL use laser-driven electron sources (ultra-short pulses of electrons with large charge per pulse through so-called laser Wakefield acceleration); these systems are not very flexible in terms of tunability of the photon energies. The generation of strong alternating fields within the Undulator structure due to so-called Wakefield's (resistive feedback from Undulator walls) is an equally unresolved problem in the previously existing concept studies, such as the appropriate micro-focusing of the electron beams. [Grüner, F. et al.: *Design considerations for table-top, laser-based VUV and X-ray free electron lasers*. Appl. Phys. B: Lasers and Optics (86), 2007, pp. 431-435].

Bragg structures allow an efficient coupling of the laser field with a pulsed electron beam, but place on the electron properties technically difficult to fulfill requirements. [Karagodsky, V. et al.: *Enhancing X-Ray Generation by Electron-Beam Laser Interaction in at Optical Bragg Structure*. Physical Review Letters (104) 2010, pp. 024801].

[Telnov, V.: *Laser Cooling of Electron Beams for Linear Collider*. Physical Physics Letters (78) 1997 No. 25, pp. 4757-4760] describes the radiative cooling of electron beams.

BRIEF SUMMARY OF THE INVENTION

Object of the invention is the generation of short-wave and ultra-short light pulses of a radiation source, wherein the light pulses have better properties. The laser should be optimally highly compressed in time on the entire interaction region, to increase interaction efficiency. Ultra-short laser pulses can be understood to mean laser pulses of a duration of less than 1 ps, and ultra-short electron pulses are understood to mean pulses of a duration of less than 10 ps. In the application, the term interaction region refers to the area of the overlap region in which for an electron pulse overlapping a laser pulse the overlap between the electron pulse and the laser pulse is given during the complete duration of the pulse overlap.

The object is achieved by an arrangement according to the first claim, which has been adapted to use with the Traveling Wave Thomson scattering method for ultra-short pulses. The Traveling Wave Thomson Scattering method (TWTS) is used with special dispersive elements. These dispersive elements should realize the optimum temporal and spatial pulse compression of the laser pulse in the overlap region at each time point of interaction with the electron pulse within an interaction region of a length of a millimeter to several meters.

The inventive arrangement can be built and can be operated with less effort and low cost. When using the inventive arrangement with a given bandwidth, a greater yield of photons as using other arrangements is obtained.

Advantageous embodiments and applications are given in the additional claims, which are described and shown using figures:

DESCRIPTION OF THE INVENTION

Existing Thomson und Compton sources have a scaling problem concerning a high photon yield per pulse. There exists a maximum laser intensity that may not be exceeded; otherwise the non-linear effects prevent the efficient backscattering in a single narrow photon energy interval.

Therefore, high photon fluxes can only be achieved via longer distances of interaction between lasers with longer pulse duration and the electrons. However, by the strength of the focusing of the laser, there is a relationship between the focus size and Rayleigh length, which determines the maximum interaction distance. The longer the Rayleigh length, the greater is the focus diameter. Thus, it is not possible both for conventional Thomson sources, i.e. to realize small interaction diameter for optimal overlap with electron pulses and to realize long interaction distances at the same time. Greater focus diameters lead to lower intensities and subsequently to lower photon fluxes of the scattered radiation.

In accordance with the TWTS method adapted according to the invention, optical reflection gratings are used in conjunction with cylindrical mirrors for generating a pulse front tilt of the laser pulse and for generating a long line of focus. Compared to conventional Thomson scattering, the inventive TWTS method with its special dispersive elements solves the problem of limiting the interaction length and as well the problem of the limitation of the laser pulse intensity.

The special feature of the designed by the inventive method TWTS sources is that an efficient coupling of the laser field with a pulsed electron beam is achieved, and that the variation of the wavelength of the radiation and its bandwidth over a wide range without changing the laser system or the electron source is possible. With this decrease both cost and effort for the adaptation to the requirements of potential users enormously over currently available sources for the generating of short-wave light pulses.

Figure 1:
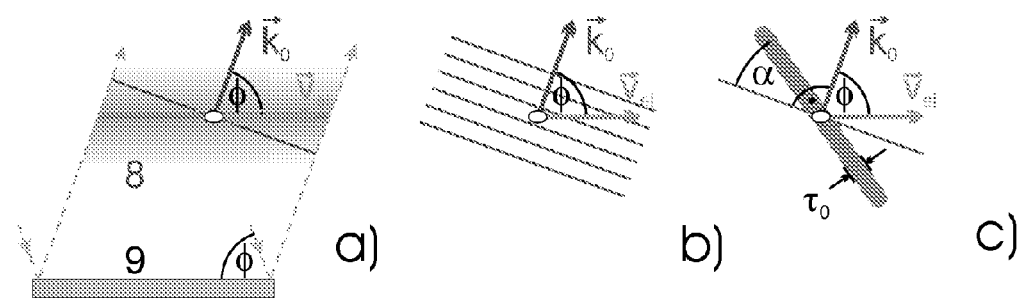
FIG. 1 shows inventive arrangement and functioning
 a) Generating a laser line focus so, that the spatial overlap of the electron pulse with the laser line focus is ensured over an interaction period,
 b) Wave fronts in lateral Thomson scattering geometry, c) Tilted laser pulse front in the overlap with an electron pulse.

To bypass the Rayleigh limit, an optical structure is required, in which the electrons do not leave the focal region of the laser. This is possible, for example, using cylindrical optics, whereby the laser is focused only in one direction to a line. Now, if the electrons propagate along this line, such as in FIG. 1a, they remain over the entire width of the laser beam in the focal region. This implies, however, a side scattering geometry with a side scattering angle or an interaction angle φ between 0° and 180° [deg.], see FIG. 1b. However, this leads to the laser and electrons propagating in different non-collinear directions, so that in these scenarios, the spatial overlap is normally lost after short distances which are comparable to the laser and/or electron beam dimensions. A solution of the problem is the tilt of the laser pulse front by a predetermined angle α, with the aim that always an overlap region of the laser and the electrons exists in spite of the beam propagation (see FIG. 1c). The tilt angle results in that the envelope of the laser pulse follows the electrons, so that they will stay stationary in relation to the temporal envelope of the laser. This area of overlap is called central interaction region.

The tilting of the laser pulse changes only the envelope, but not the wave fronts, which determines the frequency of the scattered light. The pulse front tilt leads to a position dependent propagation delay which shifts the envelope of the laser relative to the phase of the carrier wave (carrier phase). For relativistic electron energies applies $\alpha \cong \phi/2$.

Figure 2:
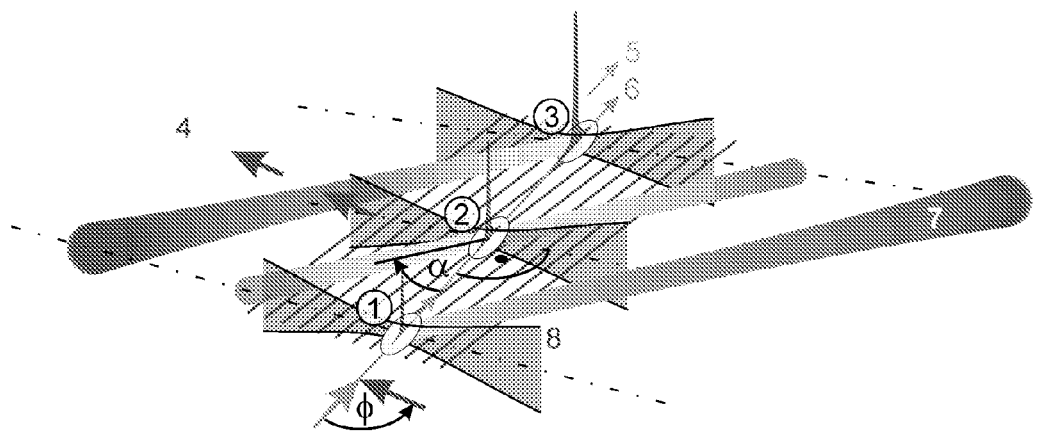
FIG. 2: 3D display, illustrating the optimal spatial and temporal pulse compression.

In laboratory reference system the electrons are exposed to the carrier frequency of the laser divided by the geometric factor$(1-\cos \phi)$. In FIG. 2 is summarized the whole principle of such Thomson source in a graph, wherein laser and electron beam positions are shown at three different times, at the beginning 1, in the middle 2 and at the end of the scattering interaction 3. The combination of three different geometries is shown: the focal line along the electron beam, the side scattering with the interaction angle φ, and the pulse front tilted by the angle $\alpha \cong \phi/2$. Further the figure shows, how the entire laser beam slides successively through the electron pulse in the course of interaction, so that all components of the laser pulse interact with the electrons. Thus, the electrons and thus also the X-ray pulse are continuously pumped by the laser, while both propagate equally along the line focus.

Figure 3:
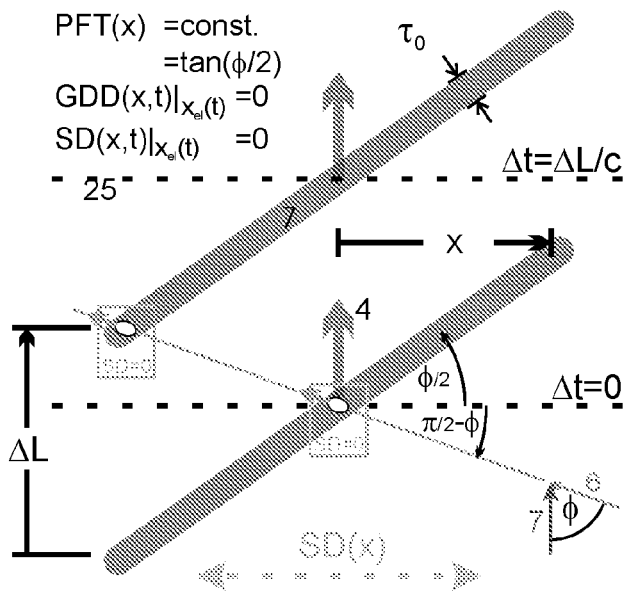
FIG. 3: Illustration of two light pulses at different time points for the optimal spatial and temporal pulse compression with a dispersive element.

During the propagation of the laser pulse with a tilted pulse front over a distance, the spatial dispersion (spatial dispersion SD) and the group delay dispersion (GDD) are changed due to the angular dispersion (AD). The spatial dispersion SD(x) varies linearly along the transverse laser pulse coordinate: $SD(x)=\Delta L(x) \cdot AD$ (see FIG. 3). Because these dispersion effects have a major influence on the pulse structure of ultrashort laser pulses, it is usually necessary to compensate for this dispersion in the optical design using additional dispersive elements.

The optical part of TWTS (FIG. 4) begins with a laser system which provides stretched laser pulses with defined spatial dispersion via a stretching-compressor system. The final grate 10 causes the required pulse front tilt of φ/2. The angular dispersion which is caused by the grating, in the following compresses the laser pulse until maximum pulse compression and vanishing spatial dispersion is achieved in the line focus of the optical assembly. This grating (varied line-spacing (VLS) grating) has varying grating spacings so that the dispersion does not disappear only at a single time, but spatially along the entire line focus. When the dispersive element is designed as a VLS grating, the VLS grating causes spatial and temporal dispersion compensation. This achieves an optimal temporal compression of the laser pulse in the overlap region at any time of the interaction and thus in the entire interaction region. This provides an increase in the scattering efficiency.

Investigations have shown that the order of the optical elements focusing element and dispersive element is of no matter if the dispersions are compensated in the overlap region according to the equations (Eq. 3), (Eq. 4) and (Eq. 6). The optimal spatial and temporal pulse compression is therefore ensured.

Grating compressors compensate spatial dispersion by lattice pairs or grating pairs. Because the laser pulse propagates non-negligible distances $\Delta L > \pi (c\tau_0)^2/(\lambda_0 \tan^2\alpha)$ at large angles φ during interaction with the electrons, this compensation method is not enough. To avoid loss of efficiency due to the longer laser pulse durations and frequency chirp in the scattered radiation, the spatial dispersion of the laser should be zero over the entire interaction distance, and not only at a specific time. Therefore, optical gratings of first order, i.e. gratings without position dependence, cannot be used.

For an electron pulse, which is overlaid with a tilted laser pulse, applies $$SD(x) = \Delta L(x) \cdot AD, \tag{Eq. 1}$$

wherein $SD(x)$ means the spatial dispersion and $AD$ means the constant angular dispersion.

The x-coordinate is the transverse position deviation from the central ray. Due to the pre-compensation of the spatial dispersion with an additional grating pair is $SD(0)=0$, and $\Delta L(0)=0$. The laser propagates a further distance $\Delta L(x)$, if the electrons move in the x direction along the laser pulse front, so that the spatial dispersion $SD(x)$ is no longer zero. To compensate the spatial dispersion $SD(x)$ it should apply:

$$SD'(x) = \partial^2 x_{out}/\partial \Delta v \partial x_{in} \neq 0. \tag{Eq. 2}$$

Therefore, no first-order approximations can be assumed because the required optics contains non-negligible higher order derivatives in x.

The TWTS-method and a corresponding apparatus have to fulfil the following conditions:
1. The change in spatial dispersion $SD(x,t)=\partial x_{out}/\partial \Delta v$ along the electron trajectory $x_{el}(t)$ and hence across the laser beam diameter should compensate the spatial dispersion, which was acquired through the laser propagation distance $\Delta L(x)$ to the interaction line. This leads to an efficient overlap with the electrons and an optimum laser compression (see FIG. 3). Because the laser propagation distance $\Delta L(x)$ is defined by the difference in slopes of electron bunch trajectory and laser pulse front tilt with respect to the wave front, it is obtained:

$$SD(x, t)\Big|_{x=x_{el}(t)} \equiv SD(x_{el}(t), 0) - AD(x_{el}(t)) \cdot \Delta L(x_{el}(t)) << \frac{\pi c \tau_0^2}{\tan \phi / 2} \tag{Eq. 3}$$

$$\Delta L(x) = (\tan(\pi/2 - \phi) + \tan(\phi/2)) \cdot x \tag{Eq. 4}$$

2. The required pulse front tilt $PFT(x)=c \cdot (\partial \Delta t(x)/\partial x)$ needs to be constant across the entire laser pulse, so that the pulse front is not bent, $$c \cdot \Delta t(x) - x \cdot \tan \phi/2 << c\tau_0. \tag{Eq. 5}$$

3. The temporal profile of the laser should not change, so that the group delay dispersion GDD is less than the transform limited pulse duration:

$$GDD(x, t)\Big|_{x=x_{el}(t)} \Delta v_0 = \frac{\partial \Delta t_{out}(x, t)}{\partial \Delta v}\Big|_{x=x_{el}(t)} \Delta v_0 << c\tau_0, \tag{Eq. 6}$$

which can be expressed for general temporal pulse shapes, as well as for non-linearly chirped pulses, as $$\left\langle \left(\frac{\Delta v}{2\pi} GDD(x, t, \Delta v)\Big|_{x=x_{el}(t)}\right)^2 \right\rangle_{\Delta v} << \langle \tau_0^2 \rangle. \tag{Eq. 7}$$

Figure 4:
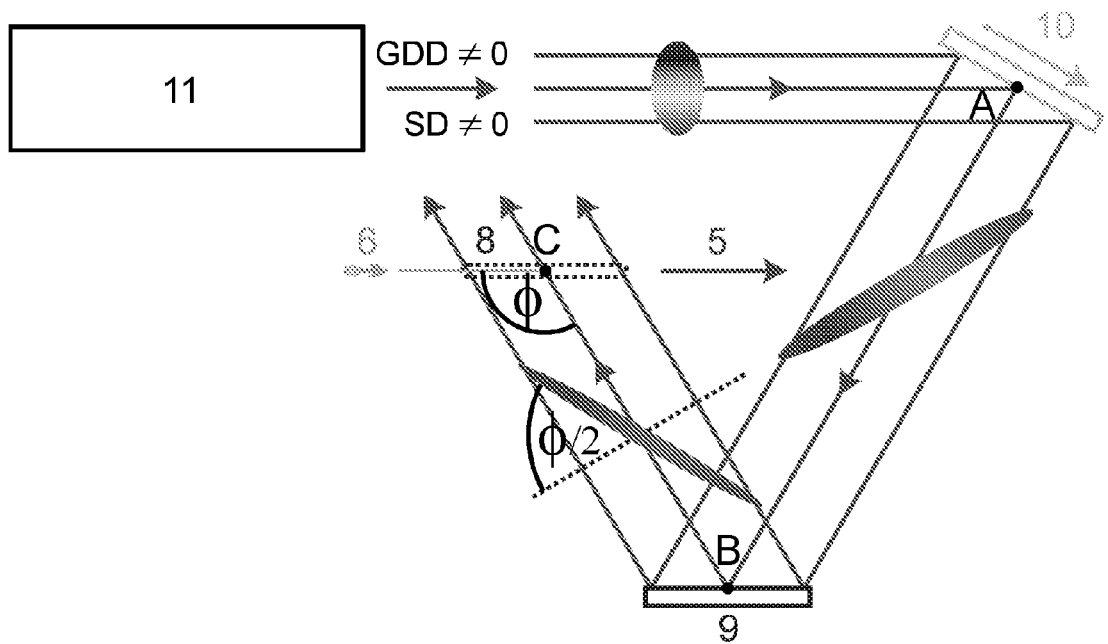
FIG. 4: optical layout of a TWTS source.

The in FIG. 4 shown structure realizes a pre-compensation of the spatial dispersion (SD) and of the group delay dispersion (GDD) for the dispersion of the beam from the grating to the interaction region by an additional grating combination at the beginning of the arrangement. This type of SD and GDD compensation is standard technology and is widely used in optical stretchers and compressors for CPA lasers (chirped pulse amplification laser).

The two dispersions SD and GDD, according to the equations (Eq. 3), (Eq. 4) and (Eq. 6), have to disappear not only at a certain time of the laser beam propagation, but must be sufficiently small or disappear at the respective current electron pulse position along the entire interaction distance. In the arrangement of FIG. 4, for compensation a VLS grating with a square grating spacing chirp is used as the last grating. Thus, an additional angular dispersion $$AD(x) = AD_0 + SD_0 \cdot C_1 \cdot x, \tag{Eq. 8}$$

is realized, which varies linearly over the laser beam diameter, so that the condition for the linear spatial dispersion (Eq. 3) in the line focus after the last propagation distance $L_0 = \overline{ABC}$ is fulfilled. $AD_0$ and the product $SD_0 \cdot C_1$ are constant parameters that are defined by design.

In an existing laser system and an electron source, a suitable combination of the gratings with the corresponding grating spacings and angles between the gratings can be determined. The determination of the grating spacings is made on the basis of ray tracing with the help of Kostenbauder formalism of higher order.

The cylindrical mirror (see FIG. 4) focuses only in one dimension, thereby it is possible to reduce the description of plane waves in two dimensions. Thus, the wavefront extending parallel to the plane of interaction can be neglected, wherein the plane of interaction is spanned by the directions of the laser beam and electron beam. The laser pulse in 2D can be described using a raytracing approach, because all gratings introduce dispersions in the same manner, in each plane parallel to the plane of interaction.

An optical system of first order can be described by a 4×4—matrix M with beam input and output components (position x, angle θ, time delay $\Delta t$, frequency shift $\Delta v$) in relation to a center beam, according to Kostenbauder [Kostenbauder, A. G.: *Raypulse matrices: a rational treatment for dispersive optical system*. IEEE Journal of Quantum Electronics 26 (1990). pp. 1148-1157].

$$\begin{pmatrix} x_{out} \\ \theta_{out} \\ \Delta t_{out} \\ \Delta v \end{pmatrix} = \underbrace{\begin{pmatrix} \frac{\partial x_{out}}{\partial x_{in}} & \frac{\partial x_{out}}{\partial \theta_{in}} & 0 & \frac{\partial x_{out}}{\partial \Delta v} \\ \frac{\partial \theta_{out}}{\partial x_{in}} & \frac{\partial \theta_{out}}{\partial \theta_{in}} & 0 & \frac{\partial \theta_{out}}{\partial \Delta v} \\ \frac{\partial \Delta t_{out}}{\partial x_{in}} & \frac{\partial \Delta t_{out}}{\partial \theta_{in}} & 1 & \frac{\partial \Delta t_{out}}{\partial \Delta v} \\ 0 & 0 & 0 & 1 \end{pmatrix}}_{M} \cdot \begin{pmatrix} x_{in} \\ \theta_{in} \\ \Delta t_{in} \\ \Delta v \end{pmatrix} \tag{Eq. 9}$$

$$M = \begin{pmatrix} A & B & 0 & E \\ C & D & 0 & F \\ G & H & 1 & I \\ 0 & 0 & 0 & 1 \end{pmatrix} = \tag{Eq. 10}$$

$$\begin{pmatrix} \text{spatitial } magn. & \text{offset by angle} & 0 & SD \\ \text{focus} & \text{angular } magn. & 0 & AD \\ puls \text{ front tilt} & \text{time-angle} & 1 & GDD \\ 0 & 0 & 0 & 1 \end{pmatrix}$$

Using plane waves, the matrix elements of M represent direct physical meanings, such as spatial magnification for element A or group delay dispersion (GDD) for the element I. For variable gratings (varied line spacing—VLS), this approach is extended and leads to not negligible higher order terms in the ray coordinate $x_{in}$.

Figure 6:
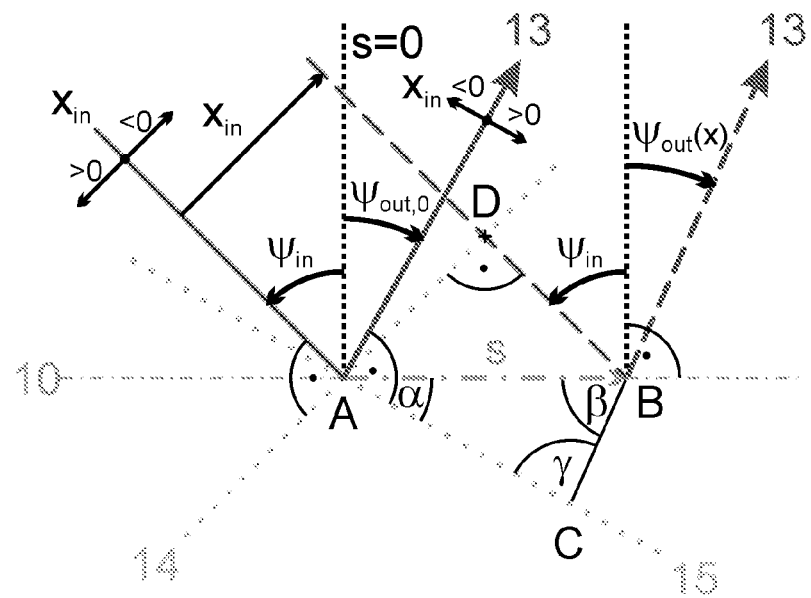
FIG. 6: geometrical relationship between reflection of the laser pulse at a (VLS)-grating and the dispersion control for optimal spatial and temporal pulse compression.

For a general, planar grating, it is necessary to derive the behavior of spatially displaced rays and include the position dependencies in all other relations including the grating constant. In FIG. 6, the ray displaced by a distance $x_{in}$ hits the VLS grating at the grating surface coordinate $s=\overline{AB}-x_{in}/\cos\psi_{in}$, which determines an diffraction angle $\psi_{out}(x_{in})$ different from the central ray output angle $\psi_{out,0}$. The two reference planes (shown in FIG. 6) represent the wave fronts of the ingoing and the outgoing beam. All changes to the beam characteristics are considered in relation to the central ray and its reference plane. The resulting spatial displacement with respect to the central ray thus equals $\overline{AC}$, and the temporal delay is the difference $(\overline{DB}-\overline{BC})/c$. Using FIG. 6, the following angular relationships: $\alpha=\psi_{out,0}$, $\beta=\pi/2-\psi_{out}(x_{in})$ and $\gamma=\pi/2-(\psi_{out,0}-\psi_{out}(x_{in}))$ can be determined. Using the sine theorem we find $$A(x_{in}) \cdot x_{in} = \overline{AC} = -\frac{\cos\psi_{out}(x_{in})}{\cos(\psi_{out,0} - \psi_{out}(x_{in}))} \cdot \frac{x_{in}}{\cos\psi_{in}} \quad \text{(Eq. 11)}$$

$$G(x_{in}) \cdot x_{in} = (\overline{DB} - \overline{BC})/c = \frac{\sin\psi_{out,0}}{\cos(\psi_{out,0} - \psi_{out}(x_{in}))} \cdot \frac{x_{in}}{c \cdot \cos\psi_{in}} \quad \text{(Eq. 12)}$$

VLS gratings have focusing properties because the output angle of $\psi_{out}$ changes with the position at which the beam incidents on the grating surface. Thus, the following applies:

$$C(x_{in}) \cdot x_{in} = \psi_{out,0} - \psi_{out}(x_{in}). \quad \text{(Eq. 13)}$$

The angular magnification $D(x_{in})=\partial\theta_{out}/\partial\theta_{in}$ and the angular dispersion $F(x_{in})=\partial\Delta t_{out}/\partial\Delta v_{in}$ are both derivatives of the grating equation:

$$D(x_{in})=-(\partial\psi_{out}(x_{in})/\partial\psi_{in}) \quad \text{(Eq. 14)}$$

$$F(x_{in})=-(\partial\psi_{out}(x_{in})/\partial v) \quad \text{(Eq. 15)}$$

The matrix elements are $B(x_{in})=E(x_{in})=H(x_{in})=I(x_{in})=0$, because the rays are reflected at the grating surface with no time delay or spatial displacement.

Using the equations of the grating distance function $d(s)=d_0+\alpha_g\lambda_0 s+b_g\lambda_0 s^2$, the grating equation $\psi_{out}(x_{in})=\arcsin(c/(v \cdot d(x_{in})/\cos\psi_{in}))+\sin\psi_{in})$ and the above relations, the matrix elements can be written as:

$$A(x_{in}) = \quad \text{(Eq. 16)}$$
$$-\cos\psi_{out}/\cos\psi_{in} + a_g x_{in}\tan\psi_{out} \cdot (\tan\psi_{in} - \sin\psi_{out}/\cos\psi_{in})^2$$

$$C(x_{in}) = -a_g \frac{(\sin(\psi_{in}) - \sin(\psi_{out}))^2}{\cos(\psi_{in})\cos(\psi_{out})} + \quad \text{(Eq. 17)}$$
$$x_{in}(4b_g + 4b_g\cos(2\psi_{out}) + 8a_g^2\sin(\psi_{in}) - a_g^2 x\sin(2\psi_{in} - \psi_{out}) -$$
$$7a_g^2\sin\psi_{out} - a_g^2\sin(3\psi_{out}) + a_g^2\sin(2\psi_{in} + \psi_{out})) \cdot$$
$$(\tan\psi_{in} - \sin\psi_{out}/\cos\psi_{in})^2 / (8\cos^3\psi_{out})$$

$$D(x_{in}) = \quad \text{(Eq. 18)}$$
$$-\cos\psi_{in}/\cos\psi_{out} - a_g x_{in}(\cos^2\psi_{out}\sin\psi_{in} + \cos^2\psi_{in}\sin\psi_{out}) \cdot$$
$$(\tan\psi_{in} - \sin\psi_{out}/\cos\psi_{in})^2/\cos^3\psi_{out}$$

$$F(x_{in}) = (\lambda_0/c(\tan\psi_{out} - \sin\psi_{in}/\cos\psi_{out})) - \quad \text{(Eq. 19)}$$
$$a_g x_{in}\lambda_0/c(\sin\psi_{in} - \sin\psi_{out})^2 \cdot$$
$$(\sin\psi_{in}\sin\psi_{out} - 1)/(\cos\psi_{in}\cos^3\psi_{out})$$

$$G(x_{in}) = (-\sin\psi_{out}/\cos\psi_{in} + \tan\psi_{in})/c. \quad \text{(Eq. 20)}$$

The grating chirps are mostly small and of a non-oscillatory nature. Thus the system can be described as a non-linear vector function $$v_{out}=O_{VLS}(v_{in}). \quad \text{(Eq. 21)}$$

which operates on the input ray vector $v_{in}=(x_{in},\theta_{in},\Delta t_{in},\Delta v)$. Because the nonlinearity of $O_{VLS}$ exists only in the spatial displacement coordinate $x_{in}$, it remains linear in the other coordinates. Therefore, the structures of the new operator still locally corresponds to a Kostenbauder matrix:

$$x_{out}(x_{in},\theta_{in},\Delta v)=A(x_{in}) \cdot x_{in} + B(x_{in}) \cdot \theta_{in} + E(x_{in}) \cdot \Delta v \quad \text{(Eq. 22)}$$

$$\theta_{out}(x_{in},\theta_{in},\Delta v)=C(x_{in}) \cdot x_{in} + D(x_{in}) \cdot \theta_{in} + F(x_{in}) \cdot \Delta v \quad \text{(Eq. 23)}$$

$$\Delta t_{out}(x_{in},\theta_{in},\Delta t_{in},\Delta v)=G(x_{in}) \cdot x_{in} + H(x_{in}) \cdot \theta_{in} + \Delta t_{in} + I(x_{in}) \cdot \Delta v \quad \text{(Eq. 24)}$$

$$\Delta v=\Delta v_{in}=\Delta v_{out} \text{ and } B(x_{in})=E(x_{in})=H(x_{in})=H(x_{in})=I(x_{in})=0 \quad \text{(Eq. 25)}$$

In the limit of uniform gratings, where $\alpha_g$ and $b_g \rightarrow 0$, the Kostenbauder matrix simplifies for a standard grating to:

$$M_g = \begin{pmatrix} -\dfrac{\cos\psi_{out}}{\cos\psi_{in}} & 0 & 0 & 0 \\ 0 & -\dfrac{\cos\psi_{in}}{\cos\psi_{out}} & 0 & \dfrac{\lambda_0(\sin\psi_{out} - \sin\psi_{in})}{c\cos\psi_{out}} \\ \dfrac{\sin\psi_{in} - \sin\psi_{out}}{c\cos\psi_{in}} & 0 & 1 & 0 \\ 0 & 0 & 0 & 1 \end{pmatrix} \quad \text{(Eq. 28)}$$

The operators are sequentially applied to the input rays for individual embodiments:

$$v_{out}=M_p(s) \cdot O_{VLS}(\psi_{in},\psi_{out},b_g)(M_{gen}(SD,GDD) \cdot v_{in}), \quad \text{(Eq. 27)}$$

wherein the second factor of (Eq. 27) denotes the non-linear part of the system that operates on non-delayed, collimated input rays. The matrix $M_{gen}$ represents the first order of a general stretcher/compressor system (see FIG. 4) with a defined group delay dispersion (GDD) and spatial dispersion (SD):

$$M_{gen}(SD, GDD) = \begin{pmatrix} 1 & 0 & 0 & SD \\ 0 & 1 & 0 & 0 \\ 0 & -SD & 1 & GDD \\ 0 & 0 & 0 & 1 \end{pmatrix} \quad \text{(Eq. 28)}$$

The Kostenbauder matrix for free propagation $M_p(L)$ is determined by $$M_p(L) = \begin{pmatrix} 1 & L & 0 & 0 \\ 0 & 1 & 0 & 0 \\ 0 & 0 & 1 & 0 \\ 0 & 0 & 0 & 1 \end{pmatrix}. \quad \text{(Eq. 29)}$$

The combined operator expression of (Eq. 27) does not depend solely on the spatial displacement coordinate $x_{in}$, but on all input ray coordinates. In the case of a collimated input beam $(\Delta x_{in},0,0,\Delta v)$, the output beam components $(x_{out}(x_{in},\Delta v),\theta_{out}(x_{in},\Delta v),\Delta t_{out}(x_{in},\Delta v),\Delta v)$ are higher order polynomials in $x_{in}$ and $\Delta v$, wherein their coefficients are functions of the parameters of the optical setup or design.

For the design of optical systems using VLS gratings, it is useful to reduce the complexity of the grating function. Accordingly, the focusing element in (Eq. 10) simplifies to $$C(x_{in}) = -a_g \frac{(\sin(\psi_{in}) - \sin(\psi_{out}))^2}{\cos(\psi_{in})\cos(\psi_{out})} + O(x_{in}). \quad \text{(Eq. 30)}$$

because the lowest order is influenced only by the linear chirp. The corresponding effective focal distance $f_{eff}$ is given in first approximation by the distance that a beam needs to propagate to the beam center.

$$(C_0 \cdot f_{eff} + A_0) \cdot x_{in} = 0 \quad \text{(Eq. 31)}$$

$$\Rightarrow f_{eff} = \frac{-\cos^2 \psi_{out}}{a_g(\sin\psi_{in} - \sin\psi_{out})^2} \quad \text{(Eq. 32)}$$

However $\alpha_g$ has to remain zero, since the focusing of the beam is not the goal, because the behavior of the lowest order for a quadratic chirp $b_g$ is important. Of all matrix elements, only the focusing element $C(x_{in})$ is modified, so that the angular dispersion is proportional to $x_{in}$:

$$C(x_{in}) = \underbrace{x_{in}(4b_g + 4b_g\cos(2\psi_{out})) \cdot \frac{(\tan\psi_{in} - \sin\psi_{out}/\cos\psi_{in})^2}{8\cos^3\psi_{out}}}_{C_1} + O(x_{in}^2) \quad \text{(Eq. 33)}$$

Applied to a laser beam with a spatial dispersion, this leads to an additional angular dispersion, which varies linearly across the entire beam diameter;

$$AD(x_{in}) = AD_0 + SD_0 C_1 \cdot x_{in} \quad \text{(Eq. 34)}$$

The requirement of a pulse front tilt by $\phi/2$ is defined in a first approximation by the grating properties.

$$\psi = a cr \sin(\cos\psi_{out}(\tan\psi_{out} - \tan\phi/2)) \quad \text{(Eq. 35)}$$

The stretcher-compressor combination at the beginning of the assembly ensures that in a first approximation GDD and SD disappear in the line focus, so that together with (Eq. 35) in the first order the pre-compensation of spatial dispersion SD is $$SD_0 = \frac{\partial x_{out}}{\partial \Delta v} = \frac{L_0 \lambda_0 \tan\phi/2}{c \cdot \cos\psi_{out}} \sqrt{\cos(\phi - \psi_{out})\cos\psi_{out}/\cos^2\phi/2} \quad \text{(Eq. 36)}$$

and for group delay dispersion GDD is $$GDD_0 = \frac{\partial \Delta t}{\partial \Delta v} = L_0 \lambda_0/c^2 \tan^2\phi/2. \quad \text{(Eq. 37)}$$

For the output angle $\psi_{out}$, according to the above two equations, applies $$\psi_{out} > \pi/2 - \phi \quad \text{(Eq. 38)}$$

and the grating spacing $d_0$ is determined by the grating equation $$d0 = \lambda_0/(\sin\psi_{out} - \sin\psi_{in}). \quad \text{(Eq. 39)}$$

To fulfill equation (Eq.3), as a first order correction, a grating spacing $$d(s) = d_0 + b_g \lambda_0 s^2 \quad \text{(Eq. 40)}$$

is assumed, which follows a square dependence along its surface coordinate.

By extending the Kostenbauder formalisms to higher orders and calculating the spatial dispersion $SD(x_{in}) = \partial x_{out}(x_{in},\Delta v)/\partial \Delta v$ in the interaction region with a distance $L_0$ in higher orders of the transversal beam coordinate $x_{in}$, one obtains for equation (Eq. 3):

$$\frac{SD(x_{in})}{x_{out}(x_{in})} = AD(x_{in}) \cdot (\tan(\pi/2 - \phi) + \tan(\phi/2)) \quad \text{(Eq. 41)}$$

The higher order dispersion is neglected and the quadratic chirp of the grating line spacing is calculated to $$b_g = -\frac{\cos\psi_{out} \cdot (\tan(\pi/2 - \phi) + \tan\phi/2)}{2L_0^2 \tan^2\phi/2}. \quad \text{(Eq. 3)}$$

The above calculations use a grid function of the second order (quadratic VLS-profile), although other grid functions can be used to achieve a similar effect. The only remaining degrees of freedom in this design are now the length $L_0$ between the VLS grating and the line focus, as well as the outgoing angle $\psi_{out}$. Using this remaining parameter space, the dispersion conditions (Eq. 3) to (Eq. 6) can be calculated and subsequently minimized. The equations (Eq. 39), (Eq. 40) and (Eq. 42) describe a possible implementation of a VLS-grating as a dispersive element. Thereby, the compensation of the above dispersion conditions will be achieved not only at a particular time in a particular place, but in the whole interaction region.

The arrangement is not limited to collimated rays.

Figure 5:
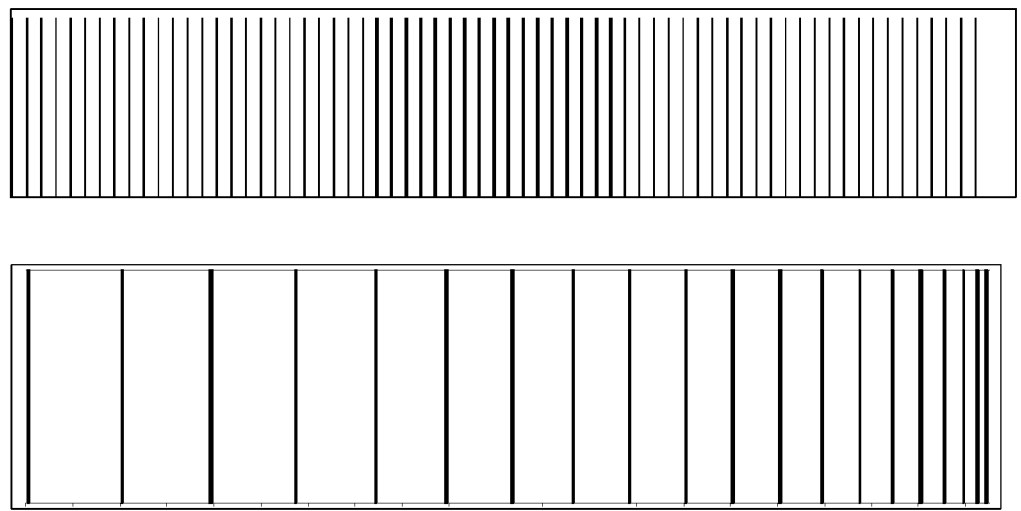
FIG. 5: uniform grating (top) and with variable grating spacings (below)

A further advantageous embodiment of the dispersive element is the use of an optical grating with a uniform grating spacing (FIG. 5 (top)) in combination with a high-precision, deformed mirror, so that the so-curved mirror surface has beam imaging properties which correspond to those of the grating with a varying grating spacing (FIG. 5 (bottom)).

Also possible is using a mirror which has both properties, i.e. the combination of a mirror with high-precision beam imaging properties and of the focusing mirror.

Another embodiment of the arrangement is that the in one direction focusing optical element and the dispersive element can be replaced with a in one direction focusing optical element, wherein the in one direction focusing optical element is processed such that it additionally comprises the features of an optical grating non-uniform grid spacing, e.g. a mirror onto which is coated an optical grating with non-uniform grating spacing.

As focusing optical elements not only mirrors can be used, but for special applications lenses are possible.

The above arrangement is not only limited to the use of electron sources. Other suitable radiation or particle sources can be used.

One use of the above arrangement is the generation of directed radiation of a certain wavelength. Here, the pulse front tilt of the laser pulse and the overlap angle between the electron beam and the laser beam are used. The pulse duration of the emitted short wave light pulse is only limited by the duration of the electron pulse, the minimum wavelength by the energy of the electrons. Moreover, the bandwidth of the radiation can be determined by appropriate choice of the local field intensity of the laser pulse in the interaction region, and by the length of the laser line focus. In addition, the temporal and/or spatial coherence properties can be adjusted by means of varying the laser pulse front tilt. This allows for the design of a suitable light source for a specific application if the desired radiation properties such as maximum power and coherence, are fixed. A customized combination of laser and electron source, reflection gratings and cylindrical mirrors may be calculated.

The achievable high photon numbers in ultra-short pulses of high brilliance, along with in principle tunable wavelengths from EUV to hard X-rays, provide unique diagnostic techniques and methods in research and industry, such as pump-probe experiments with X-rays on ultrashort time scales, structural analysis of single molecules, superconductivity research, and time-resolved diagnostics of processes in dense, hot plasmas.

Compared to synchrotrons and free electron lasers, these sources are compact, cost-effective and thus attractive for universities, research institutes and companies. This is made possible by the relative lower electron energies and thereby smaller electron accelerators. Especially in combination with laser-accelerated electrons, systems feasible in laboratory size may be completely optically controlled and synchronized.

One application provides in the field of EUV lithography, wherein the inventive arrangement replaces previously scheduled free electron laser (FEL). The use of an FEL shows in concept studies [Socol, Y.: 13.5-*nm EUV Lithography for Free Electron Laser*. Proceedings of the FEL Conference, 2010] that the necessary photon yield can be achieved but it is very cost intensive. Our inventive arrangement, shown in FIG. 7, is a less expensive alternative.

Figure 7:
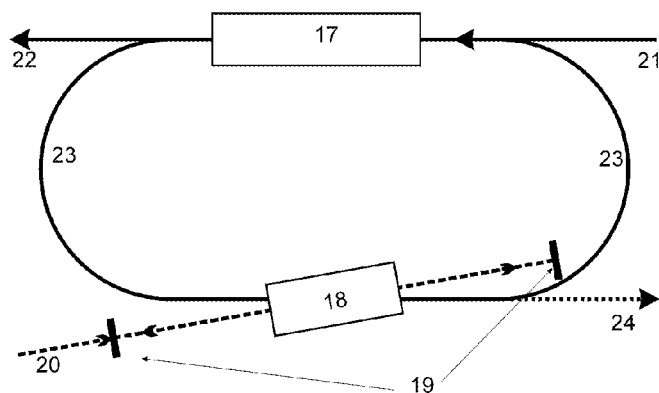
FIG. 7: Ring accelerator coupled with a TWT-FEL in a resonator.

As shown in FIG. 7, electrons are accelerated to the target energy in a highly repetitive electron storage ring with a high average current to realize radiation in the EUV range in a compact electron laser realized by TWTS. The required average radiation power is achieved through a high level of repetition of both the electron source, as well as the laser. The required intensity at high repetition rate is achieved by a resonator. It is necessary, to reset the dispersion in the resonator periodically with the help of at least one other dispersive element. Compared to previous approaches, which provide for a conventional free electron laser, this approach has the advantage that it works with lower electron energies, and thus the electron accelerator and the FEL can be realized on a much smaller scale and thus at lower cost. Unlike discharge and plasma sources, no debris is created here.

Another possible application is suitable for the investigation of materials using phase-contrast imaging. In this method, in contrast to conventional X-ray imaging method, the absorption coefficient of a material is not used, but the index of refraction n of the material in the corresponding X-ray range. As (n-1) is higher by orders of magnitude, than the absorption coefficient, interferometry methods, which use the local refractive index, are much more sensitive than the conventional absorption method.

This makes it possible to investigate small structures in solids (e.g. microscopic fissures in parts production) and soft organic matter (e.g. organs). Due to the better contrast and lower dose to diagnostic applications, applications in radiology are feasible, wherein, a significant medical use here the mammographic screening for breast cancer. For this process, spatial and temporal coherence conditions must be met, which is why high-quality images with a short recording time have been predominantly produced by synchrotron sources so far.

Another possible application opens up when media (e.g. solids, plasmas, etc.) may be used instead of the particle beam. In laser technology, for example, there is the possibility to pump elongated laser media (laser rods) by side and therefore avoid disadvantages such as short relaxation time of the laser medium, non-linear propagation effects and/or amplified spontaneous emission (ASE).

TWTS may also be used for non-radiative processes, e.g. to excite efficiently weak transitions in relativistic ion beams. In this case, the pump wavelength may be specifically and accurately defined by the interaction angle or the ion energy.

Another possible application is the radiative electron or, equivalently, positron cooling. In an electron storage ring in this case, the Thomson or the Compton scattering is not primarily used as a source of light. Instead, the recoil of the emitted x-ray radiation on the electrons in the scattering process, and subsequently carried out re-acceleration are used to gradually cool the electron pulse over many scattering events in order to achieve previously unattained beam properties.

Due to the high number of required scattering processes per electron, the needed arrangement is similar to the arrangement for EUV lithography (see FIG. 7), with the difference that TWTS does not have to be operated as a FEL here.

This here described process/method and the special arrangement stand out from competing methods for generating short-wave, ultrashort light pulses, and thus are more uses conceivable:

Using today known high-performance short-pulse lasers, single shot photon numbers can be produced with TWTS a low-bandwidth windows, which are several orders of magnitude higher than what current Thomson backscatter sources provide at a comparable range and comparable laser parameters. TWTS-based sources can compete in their single-shot performance with classical FEL-based sources of the latest generation (FLASH), but are much more compact, less complex to implement in the design and cost.

The photon energy of a TWTS-source may be selected or set within a wide range by appropriate choice of pulse front tilt. This tunability goes far beyond the capabilities of conventional, accelerator-based sources and requires relatively little investment in suitable optical gratings.

The TWTS process is a purely optical method; therefore no adverse effects occur, such as unwanted induced fields in classical Undulator structures at high electron pulse charges.

TWTS sources, by using suitable electron sources with low emittance and high peak load time, can deliver temporally and spatially coherent pulsed radiation, the properties of which correspond to the radiation of so-called FELs.

The bandwidth of the radiation can be adjusted by suitable choice of the interaction length.

The requirements imposed by TWTS on the used electron pulses, such as pulse energy, pulse length, or emittance, are significantly lower than those of comparable sources such as table-top SASE FELs.

TWTS-radiation is produced by radiation of electron pulses relativistic energy and is emitted therefore directed to a small solid angle.

The interaction range can be scaled up to larger optics and beam diameters.

TWTS is suitable for high vacuum applications and produces no debris, which reduces the lifetime inserted optics.

TWTS may be used to generate, to stimulate or to pump rapidly propagating waves, excitations or modes in the line focus of media (e.g. gas, solid state, cluster, plasma, liquid or gaseous smoked media).

TWTS may be used for radiative cooling of particle beams, wherein the used arrangement is smaller than previous arrangements, it is easier to manufacture, and the interaction distance is longer or the dispersion can be controlled.

REFERENCE SYMBOLS

GDD group delay dispersion
SD spatial dispersion
AD angular dispersion
1 interaction at the beginning
2 interaction in the middle and
3 interaction at the end of the overlay
4 propagation direction
5 resulting light pulse
6 electrons
7 laser pulse
8 focus along the electron trajectory
9 in a direction focusing optical element
10 dispersive element (e.g. VLS grating)
11 laser system with stretcher and/or compressor
13 output direction
14 input reference plane
15 Output reference plane
17 acceleration route
18 inventive arrangement, the (TWTS) system
19 resonator, superevaluation cavity
20 incoming laser beams
21 electron injector
22 beam dump
23 storage ring
24 resulting (EUV) radiation
25 wavefront

The invention claimed is:

1. An apparatus for generating ultra-short short-wave light pulses, the apparatus comprising:
a laser system for generating a first beam, wherein the first beam is a laser beam propagating along a laser beam path;
a source for generating a second beam, wherein the second beam is a beam of electrons, particles or radiation, said laser system and said source being synchronized such that the first beam and the second beam interact in an overlap region;
an optical focusing element for focusing in one direction and a dispersive element, wherein said focusing element and said dispersive element are disposed along the laser beam path between said laser system and said overlap region, and wherein said dispersive element acts as a diffraction grating with non-uniform grating spacings following a square dependence.

2. The apparatus according to claim 1, wherein said focusing element for focusing in one direction is selected from the group consisting of a cylindrical mirror, a toroidal mirror, and a lens.

3. The apparatus according to claim 1, wherein said dispersive element is a diffraction grating with non-uniform grating spacings following a square dependence.

4. The apparatus according to claim 1, wherein:
said dispersive element consists of an optical grating with a uniform grating spacing and a beam imaging optical element wherein a curved surface of said beam imaging optical element is produced to additionally have characteristics of an optical grating with non-uniform grating spacings following a square dependence; or
said dispersive element is an optical grating with uniform grating spacings, and said focusing element for focusing in one direction is processed to additionally have characteristics of a beam imaging optical element.

5. The apparatus according to claim 1, wherein said focusing element for focusing in one direction and said dispersive element are one element formed as the element focusing in one direction produced to additionally have properties of an optical grating with non-uniform grating spacings following a square dependence.

6. A method, which comprises providing the apparatus according to claim 1 and superimposing therewith a pulse front tilt light pulse of high power with an ultra-short pulse of relativistic electrons in a laser line focus.

7. The method according to claim 6, which comprises varying an emitted radiation wavelength by a choice of the pulse front tilt and an angle between the second beam and the first beam.

8. The method according to claim 6, wherein, when an interaction length is increased, a number of emitted photons per pulse increases.

9. The method according to claim 6, which comprises varying a bandwidth of the laser pulse by performing at least one step selected from the group consisting of changing a length of the line focuses in an interaction region between the electron beam and laser beam, and changing a laser field intensity in an interaction region between the electron beam and laser beam.

10. The method according to claim 6, which comprises varying a size of a central interaction region by changing one or both of a duration of the laser pulse or a grating spacing.

* * * * *